US007975003B1

(12) United States Patent
Lee et al.

(10) Patent No.: US 7,975,003 B1
(45) Date of Patent: Jul. 5, 2011

(54) METHOD FOR TRACKING PAYABLE MEDIA CONTENT TRANSACTIONS

(75) Inventors: Woo J. Lee, Manhattan, KS (US);
Sanjay K. Sharma, Olathe, KS (US);
Balaji S. Thenthiruperai, Overland Park, KS (US); Jeffrey B. Danley, Lee Summit, MO (US); Mark Brigman, Greenwood, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 408 days.

(21) Appl. No.: 12/025,963

(22) Filed: Feb. 5, 2008

(51) Int. Cl.
*G06F 15/16* (2006.01)
(52) U.S. Cl. ........ 709/203; 709/217; 705/30; 455/414.1
(58) Field of Classification Search ............ 705/30, 705/50, 52, 7, 26; 713/193; 725/1, 5, 38, 725/39; 709/203, 217, 223, 226; 714/4, 714/43, 48; 717/174, 178; 455/414.1
See application file for complete search history.

(56) References Cited

U.S. PATENT DOCUMENTS

| | | | | |
|---|---|---|---|---|
| 5,790,664 | A * | 8/1998 | Coley et al. ............... | 709/203 |
| 5,819,092 | A * | 10/1998 | Ferguson et al. ........... | 717/113 |
| 6,226,618 | B1 * | 5/2001 | Downs et al. .............. | 705/51 |
| 6,671,818 | B1 * | 12/2003 | Mikurak ..................... | 714/4 |
| 6,950,804 | B2 * | 9/2005 | Strietzel ..................... | 705/26 |
| 6,963,828 | B1 * | 11/2005 | McDonald et al. ......... | 703/22 |
| 6,985,608 | B2 * | 1/2006 | Hoffman et al. ............ | 382/115 |
| 7,036,011 | B2 * | 4/2006 | Grimes et al. .............. | 713/156 |
| 7,296,284 | B1 * | 11/2007 | Price et al. .................. | 725/39 |
| 7,299,352 | B2 * | 11/2007 | Simon ......................... | 713/156 |
| 7,328,178 | B2 * | 2/2008 | Matsumoto et al. ........ | 705/34 |
| 7,346,580 | B2 * | 3/2008 | Lisanke et al. ............. | 705/50 |
| 7,366,502 | B2 * | 4/2008 | Okada ......................... | 455/414.1 |
| 7,441,020 | B2 * | 10/2008 | Dideriksen et al. ........ | 709/221 |
| 7,542,448 | B2 * | 6/2009 | Qi et al. ..................... | 370/331 |
| 7,562,150 | B2 * | 7/2009 | Patterson .................... | 709/229 |
| 7,565,354 | B2 * | 7/2009 | Yasuda ....................... | 1/1 |
| 7,593,902 | B2 * | 9/2009 | Murase ....................... | 705/59 |
| 7,603,683 | B2 * | 10/2009 | Reto ........................... | 725/34 |
| 7,650,376 | B1 * | 1/2010 | Blumenau ................... | 709/203 |
| 7,653,552 | B2 * | 1/2010 | Vaidyanathan et al. ..... | 705/1.1 |
| 2006/0252428 | A1 | 11/2006 | Agashe et al. | |
| 2007/0076663 | A1 | 4/2007 | Qi et al. | |

FOREIGN PATENT DOCUMENTS

WO WO 2006/129923 A1 12/2006

OTHER PUBLICATIONS

Roto et al., "Data Traffic Costs and Mobile Browsing User Experience", printed from World Wide Web at least as early as Aug. 7, 2007.

* cited by examiner

*Primary Examiner* — Andrew Joseph Rudy

(57) ABSTRACT

A method to facilitate determination of an extent to which payment should be exchanged between the access provider and the content provider for delivery of content items to the client stations. Each client station will be provisioned with a list of available content items, including for each a flag and/or other data specifying whether the content item is payable or non-payable. When the client station sends a content request seeking a particular one of the content items, the client station includes the flag or other data. As the content request passes through the access provider's system on the way to the content provider, the access provider then reads the flag or other data to determine whether the content item is payable and perhaps an applicable payment amount. The access provider may thereby maintain a count of payable content transactions and/or other data to facilitate proper payment.

18 Claims, 6 Drawing Sheets

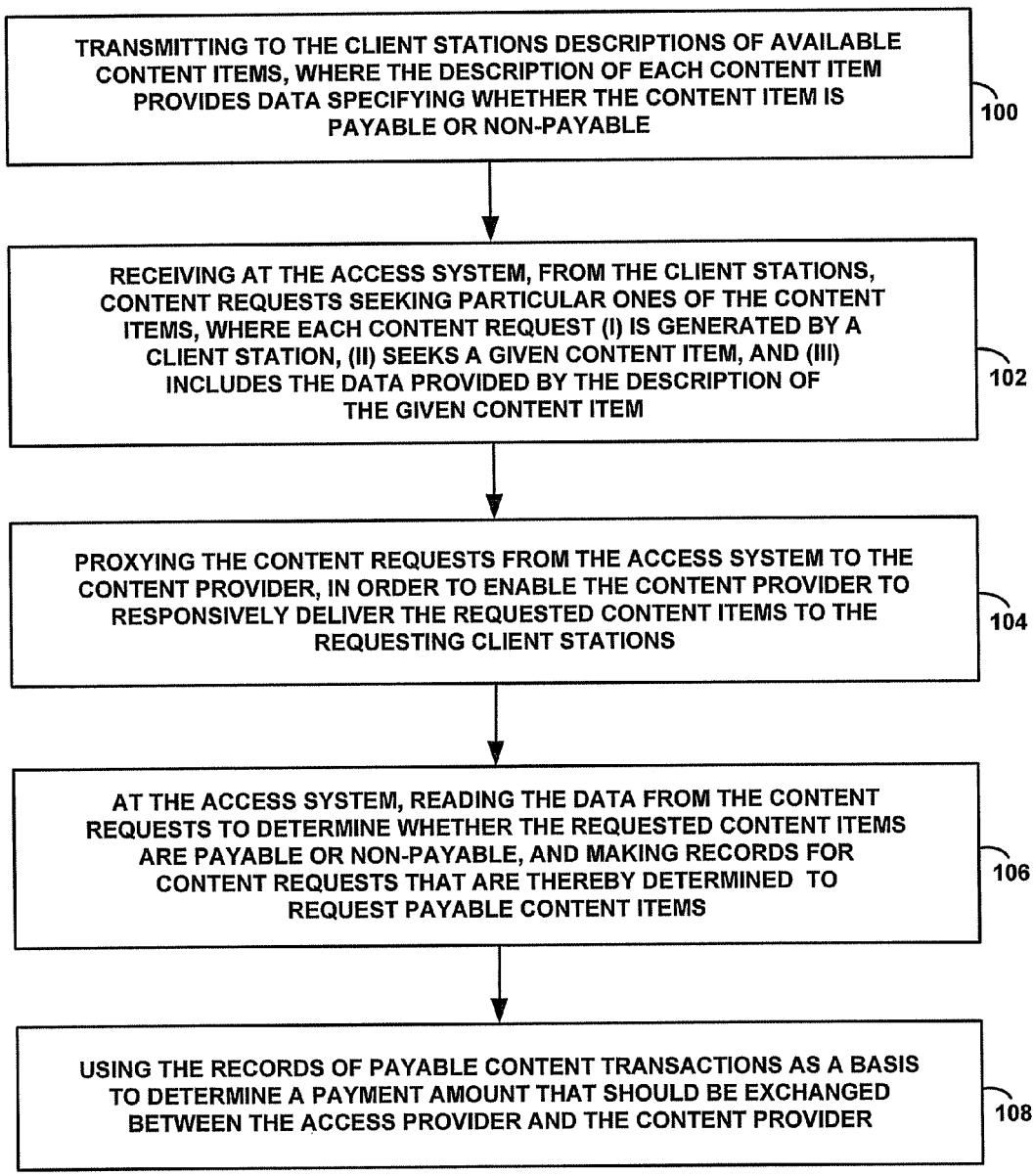

METHOD FOR TRACKING PAYABLE MEDIA CONTENT TRANSACTIONS

BACKGROUND

Wireless devices such as personal digital assistants, cellular telephones, and the like can provide a platform for playing digital multimedia (e.g., audio and visual) content, such as music, news, sports reports, and other types of multimedia. In typical practice, the media is either downloaded to the device as a file for subsequent playout by the device or streamed to the device for real-time playout.

As one example, a growing trend in the cellular wireless realm is to provide mobile-television service. In operation, a service provider offering this service would provide wireless devices with a channel-listing in the form of an extensible markup language (XML) file, for instance, that lists various available content channels, including for each a channel name and a respective Uniform Resource Identifier (URI) that points to the relevant channel content on the network. Each wireless device may then be programmed with program logic through which a user of the device can view the channel listing and select a desired channel to receive. When the user selects a channel, the device would then send a content request seeking the content from the designated URI. For mobile-television service or other content, each URI may be a Real Time Streaming Protocol URI (as described in the Internet Draft entitled "draft-ietf-mmusic-rfc2326bis-16.txt", submitted by H. Schulzrinne et al., dated Nov. 19, 2007, the contents of which are incorporated herein by reference) or may take some other form. The service provider may then deliver the requested television content by streaming it in response to the wireless device, where it would be played out to the user as the device receives it. Other types of media could be delivered in other ways.

In a typical arrangement, client stations will be served by an access-channel provider, or access provider, that will provide the client stations with network connectivity through which the client stations can request and receive media content. For instance, cellular wireless devices may be served by a cellular service provider that operates a radio access network through which the devices can communicate on a packet-switched network such as the Internet. A media content provider, such as a mobile television provider for instance, may then operate a media server on the packet-switched network.

Through this arrangement, the content provider may transmit to the client stations (e.g., as packet-data transmission, an SMS transmission, or in some other manner) a content-listing that specifies available content items and that designates for each content item a respective URI. In turn, a user of a client station may view the listing and select a desired content item, and the client station may responsively generate and transmit a content request seeking the selected content item. Such a content request would likely pass from the client station through the access provider and in turn to the content provider. And the content provider would then deliver the requested content in response to the client station.

Overview

In usual practice, an access provider that serves client stations will charge users of the client stations for network access and for any enhanced services or service packages, such as for allowing the users to download media content. By way of example, a cellular service provider will typically charge its subscribers a monthly fee for network access and may further offer its subscribers a mobile television service package for an additional fee or as part of an enhanced service package. Subscribers who sign up for the mobile television service would then be able to select and view various mobile television channels, perhaps on an unlimited basis per month. Further, the cellular service provider may allow other subscribers to access mobile television channels on a pay-as-you-go basis, charging the subscribers for each instance of mobile television service (e.g., each program) that they receive.

To facilitate providing mobile television service or delivery of other media content to client stations served by an access provider, the access provider may enter into a contractual arrangement with the content provider. Such a contract may specify that the access provider should pay the content provider a certain amount of money (or other form of payment) for each instance of content (e.g., each television program) that the content provider delivers to one of the access provider's subscribers. Thus, as the access provider charges its subscribers for media delivery service, the access provider may in turn pay the content provider for the media that the content provider delivers to the subscribers. Alternatively, there may be a situation where the content provider itself charges the subscribers for media delivery, in which case the contract may specify that the content provider should pay the access provider a particular amount of money per content transaction, to compensate the access provider for use of the access provider's network to deliver the content to the subscribers.

A vast majority of media content that a content provider delivers to an access provider's subscribers may be considered "payable," in that some form of payment should be exchanged between the access provider and the content provider for delivery of the content items. Examples of payable content items may be full television shows, movies, music, news programs, sports programs, or the like. On the other hand, some content that the content provider delivers to the access provider's subscribers may be considered "non-payable," in that no payment is expected to be exchanged between the access provider and the content provider for delivery of the content items. Examples of non-payable content items may be mere samples of full content-items, designed to market the sale of payable content items. The determination of whether a given content item will be "payable" or "non-payable" can be subject to agreement between the content provider and access provider.

In practice, if each content item is designated by a particular URI, the distinction between payable and non-payable content can be made on a per-URI basis. That is, a content item at a particular URI may be deemed a payable content item. Whereas, a content item at some other URI may be deemed a non-payable content item.

In order to track how much payment should be exchanged between the access provider and the content provider, the access provider may thus maintain a list of all content item URIs and an indication for each URI of whether the associated content is payable or non-payable. Each time a subscriber sends a content request designating a particular URI and that content request passes through the access provider on its way to the content provider, the access provider then may read the URI and refer to its list to determine if the associated content item is payable or not. If the access provider thereby determines that the requested content item is payable, the access provider may then increment a count of payable content items. (This incrementing of the count of payable content items could be done immediately in response to the request, or could instead await some subsequent trigger, such as transmission of a response from the content provider indicating that the content provider will deliver the requested content, or actual transmission of the requested content.)

Periodically, the access provider may then use the count of payable items as a basis to determine the amount of payment that should be exchanged between the access provider and the content provider. For instance, the access provider may multiply the count by a per-item payment value to determine a total payment amount. In a situation where the access provider is obligated to pay the content provider for payable content transmissions, the access provider may then pay the content provider the determined payment amount. Alternatively, in a situation where the content provider is obligated to pay the access provider for content transmissions, the access provider may bill the content provider for the determined payment amount.

Unfortunately, however, this process of accounting for transmission of payable items requires the access provider to maintain data that specifies all possible URIs or at least all payable URIs that could be requested from the content provider. Maintaining such data can be burdensome, particularly as the list of available content items changes. For instance, whenever the content provider adds a new content item (e.g., a new mobile television channel), the content provider would need to notify the access provider and let the access provider know if the content item is payable or not. Other difficulties may exist as well.

The present method provides for improved tracking of payable content transactions, to facilitate determination of an amount of payment that should be exchanged between an access provider and a content provider for content items delivered from the content provider to client stations served by the access provider. The method can be applied at an access system operated by the access provider or, for that matter, at any other point in a communication path between the client stations and the content provider. For instance, the method can be applied at an access provider gateway through which communications to and from the access provider's subscribers pass.

According to the method, the list of content items provided to client stations will include, in connection with each listed content item, a flag specifying whether the content item is payable or not. When the client station sends a content request seeking a content item selected from the list, the client station will then include the flag with the content request. As the content request passes through the access system, the access system may then simply read the flag from the content request to determine if the requested content item is payable or not and to thereby track payable content transactions. In particular, if the flag in the content request specifies that the content item is payable, the access provider may responsively increment a count of payable content items. Whereas, if the flag in the content request specifies that the content item is nonpayable, the access provider would not increment the count of payable content items. Periodically or in response to some other triggering event, the access provider may then use the count as a basis to determine an amount of payment to be exchanged between the access provider and the content provider, to account for delivery of payable content items.

These as well as other aspects, advantages, and alternatives will become apparent to those of ordinary skill in the art by reading the following detailed description with reference where appropriate to the accompanying drawings.

BRIEF DESCRIPTION OF THE DRAWINGS

FIG. 6 is a flow chart depicting method steps that can be carried out in accordance with the exemplary method.

DETAILED DESCRIPTION

Figure 1:
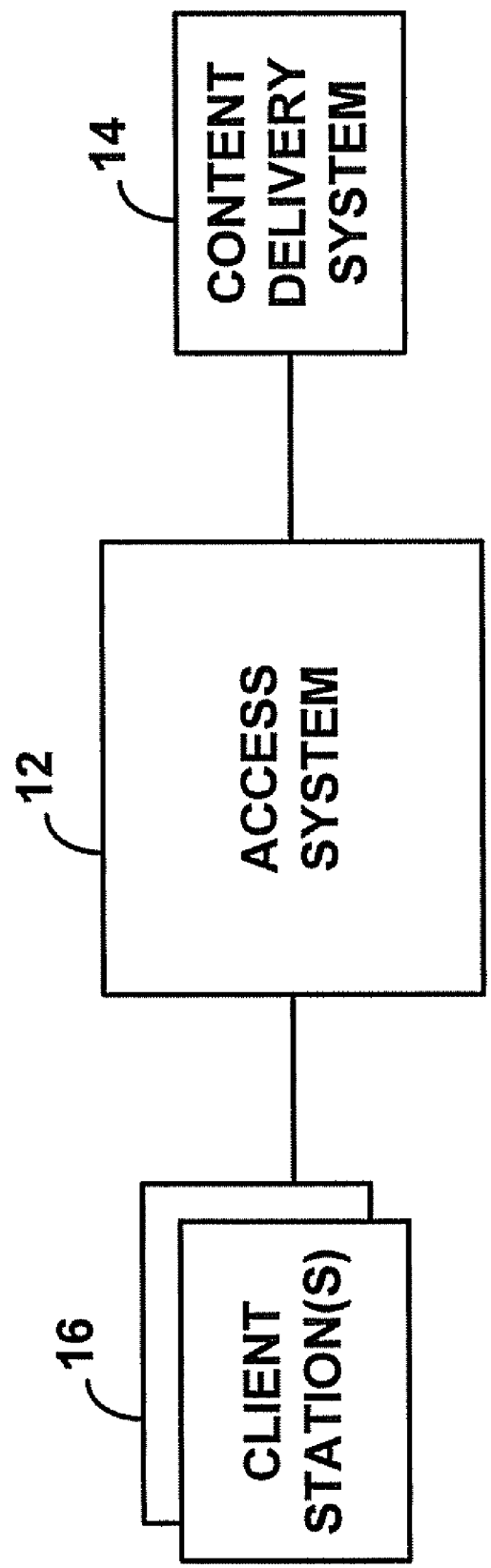
FIG. 1 is a simplified block diagram of a network in which an exemplary embodiment of the present method can be implemented.

Referring to the drawings, as noted above, FIG. 1 is a generalized block diagram of a network 10 in which an exemplary embodiment of the method can be implemented. It should be understood, of course, that the arrangement of FIG. 1 and other arrangements and functions described herein are intended to illustrate the method by way of example only and not by way of limitation. Thus, numerous changes can be made to the arrangements and functions described and illustrated, including addition, deletion, re-ordering, combining, distribution, or other modifications of components and steps. Furthermore, where this description refers to functions being carried out by one or more elements, it should be understood that the functions can be implemented using software (e.g., a processor (one or more processors) executing machine language instructions), hardware, and/or firmware.

As shown in FIG. 1, network 10 generally includes an access system 12, a content delivery system 14, and one or more client stations 16 served by the access system 12. Access system 12 is preferably owned and operated by an access provider and functions to provide client stations 16 with network connectivity, such as the ability to communicate with content delivery system 14 and to thereby request and receive media content. Content delivery system 14, in turn, is preferably owned and operated by a content provider and functions to deliver requested content items via access system 12 to client stations 16.

Figure 2:
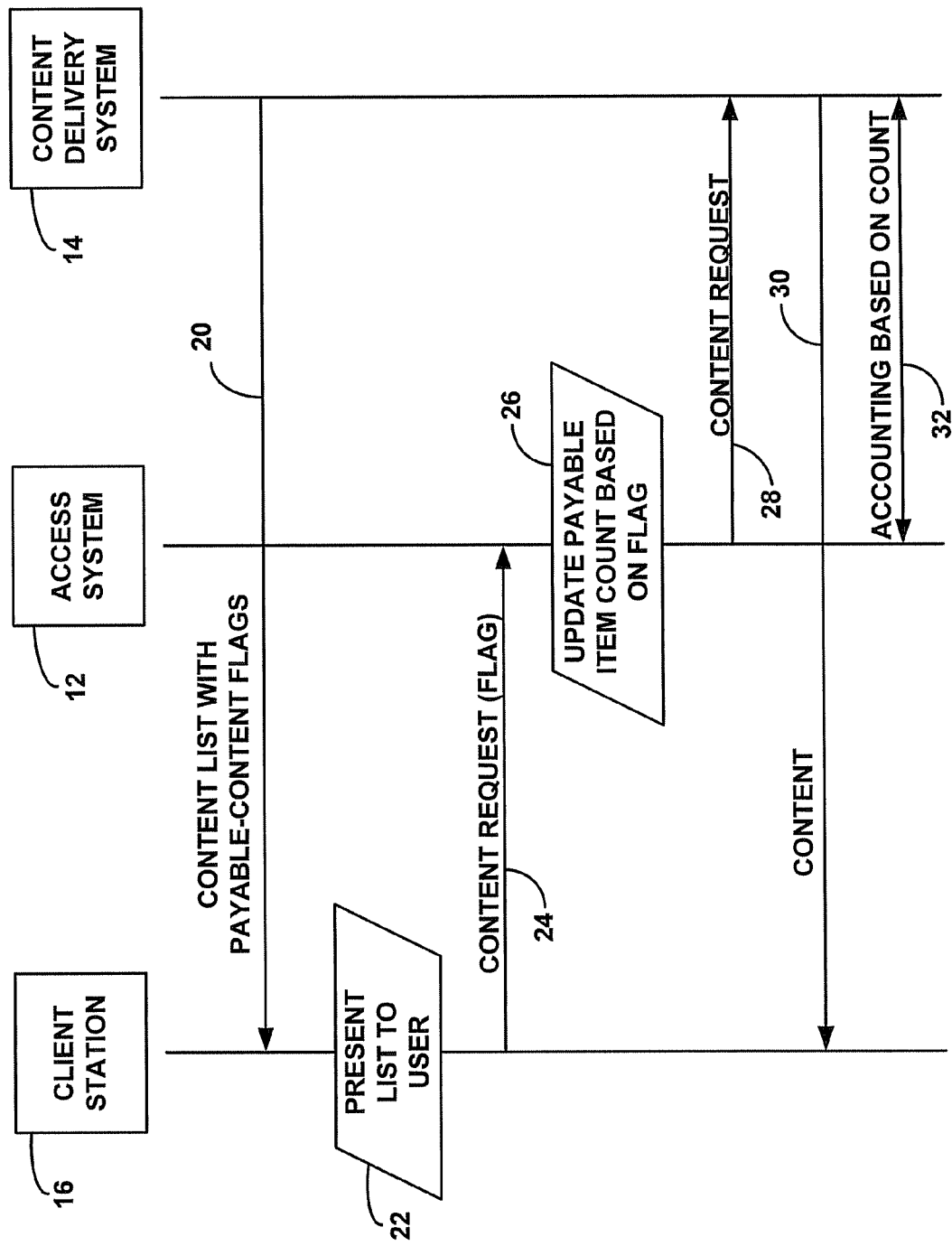
FIG. 2 is a generalized flow diagram illustrating how the present method can operate within the arrangement of FIG. 1.

FIG. 2 is next a generalized flow diagram illustrating how the present method can operate within the arrangement of FIG. 1, to facilitate determination of an amount of payment that should be exchanged between the access provider and the content provider for content delivered from the access provider to the client stations 16 via access system 12.

As shown in FIG. 2, at step 20, a content listing with flags indicating payable content is transmitted to the client stations. In particular, the content listing designates various content items available for acquisition by the client stations and provides in connection with each content-item designation a flag that specifies whether the content item is payable or nonpayable. Although FIG. 2 shows the content listing being sent from the content delivery system to the client stations, the content listing can alternatively be sent from some other origination point (e.g., the access provider) to the client stations.

At step 22, a client station that has received the content listing then presents the listing to a user, through a menu system or media-presentation application for instance, in response to user request. At step 24, upon user selection of a given content item to be acquired by the client station, the client station then generates and transmits a content request that seeks the selected content item and that includes the flag designating whether the content item is payable or not. In accordance with the method, the client station ascertains and includes the flag value by reading it from the content item designation or, equally, by copying it from the content-item designation. For instance, if the flag value is provided as a query parameter in connection with a content URI, the act of including the flag value with the content request could be a natural result of generating and sending a request for content at that URI.

Because the access system 12 provides an access channel through which the client station communications flow, the content request from the client station will necessarily flow through access system 12 on its way to the content provider. As that happens, at step 26, the access system 12 will read from the content request the flag value indicating whether the requested content item is payable or not, and the access system will increment a count of payable content items if the flag value indicates that the requested content item is payable. (This incrementing of the count could occur immediately in response to determining that the flag value indicates the content item is payable. Alternatively, the incrementing could occur at some later point, such as when the access system detects an acknowledgement from the content delivery system 14 or when the access system detects transmission of the requested content item from the content delivery system 14 to the client station.) On the other hand, if the access system 12 determines from the flag (or from absence of the flag) that the requested content is non-payable, the access system 12 will not increment the count of payable content items.

At step 28, the access system 12 forwards or proxies the content request along to the content delivery system 14, to enable the content delivery system to transmit the requested content in response to the requesting client station. And at step 30 (possibly after additional signaling), the content delivery system 14 then delivers the requested content to the client station.

Steps 22-30 will preferably occur for a plurality of content transactions, where each content transaction involves a client station requesting a particular content item. Thus, for each such request that seeks a payable content item, the access system 12 will readily update the count of payable content items.

At step 32, the access provider and content provider then account for delivery of content items. For instance, the access provider may multiply the count of payable content items by a per-item payment amount in order to determine a total payment amount. Depending on the arrangement between the access provider and the content provider, the access provider may then pay that total determined payment amount to the content provider or the content provider may pay that total determined payment amount to the access provider.

It should be understood that the elements shown in FIG. 1 are generally representative of any of a variety of types of elements. The present method is not necessarily limited to any particular type of access system, content delivery system, and client stations. Nevertheless, to help the reader understand how the invention may operate in practice, FIG. 3 next depicts a more specific example arrangement, in which content items are requested by cellular wireless devices, such as cell phones, personal digital assistants, or the like, served by a cellular service provider.

Figure 3:
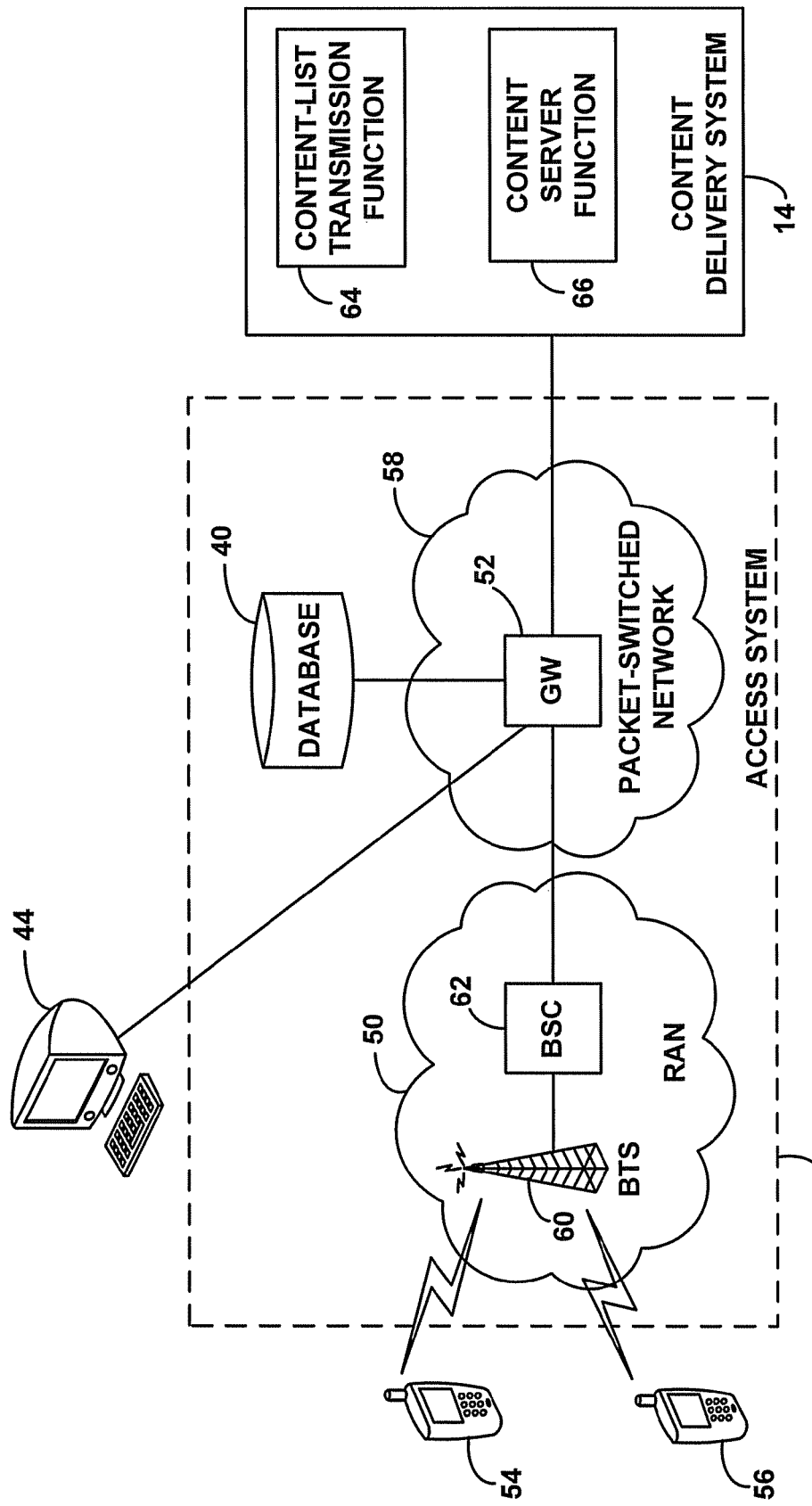
FIG. 3 is a simplified block diagram of more specific network in which the exemplary method can be implemented.

In FIG. 3, the access system 12 is shown including a radio access network (RAN) 50 and a gateway 52. The RAN is owned and operated by a cellular service provider and is arranged to serve a plurality of cellular wireless devices, two examples of which are shown as devices 54, 56. Further, the gateway 52, also owned and operated by the cellular service provider, sits on a packet-switched network 58, which provides connectivity in turn with the content delivery system 14. With this arrangement, content requests from the cellular wireless devices pass through the RAN 50 and the gateway 52 on their way to the content delivery system 14. Therefore, gateway 52 is optimally positioned to carry out functions of the present method, such as receiving content requests provided by the client stations, detecting payable content flags in the requests, and responsively incrementing a count of payable content items.

Gateway 52 is shown coupled with a database 40, such as a database server or data storage mechanism, in which gateway 52 can store various information related to the present method. In an alternative embodiment, the function of database 40 can be integrated with the gateway or provided in some other manner. In practice, for example, gateway 52 may store in database 40 the count of payable content items. As another example, gateway 52 may store in database 40 various data indicating payment amounts to be exchanged between the access provider and the content provider, as determined by the gateway's reading of payment flags or the like within content requests passing from client stations to the content delivery system.

RAN 50 provides an air interface through which the cellular wireless devices can communicate with the RAN and in turn with other entities through the RAN. RAN 50 thereby provides the devices with access to packet-switched network 58 and consequently with a channel through which the devices can communicate with content delivery system 14, in order to request and receive content items from the content delivery system 14.

Physically, RAN 50 can take any of a variety of forms and can operate in any of various ways, the details of which are not critical. At a simple level, for instance, RAN 50 could be a basic wireless access point router that radiates to define a radio-frequency (RF) air interface and that connects through one or more elements with the packet-switched network 58. At a more complex level, as shown, RAN 50 may include one or more base transceiver stations (BTSs) 60 that radiate to define cell sites and cell sectors, and one or more base station controllers (BSCs) 62 that control operation of the BTSs and manage various aspects of air interface communication.

Communication between the RAN 50 and the cellular wireless devices, including establishment of wireless packet data connectivity for the devices via the RAN, can occur according to any desired air protocol, such as CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth or others now known or later developed. Details of establishing wireless packet-data connectivity are known by those skilled in the art and are therefore not described here. In practice, what matters is that the devices are able to send content requests, typically packet-based, via the RAN 50 and gateway 52 to the content delivery system and receive requested content in response.

Packet-switched network 58 may comprise one or more networks, such as a private network owned and operated by the cellular wireless provider and a public network such as the Internet. Gateway 52 may sit on a private or public portion of packet-switched network 58 or elsewhere in the communication path between the cellular wireless devices and the content delivery system 14. In a preferred embodiment, the devices served by RAN 50 will be programmed to direct all of their packet-data communications to the gateway 52, for transmission in turn by the gateway to designated destination addresses. Alternatively, RAN 50 or some other infrastructure could be arranged to direct any such traffic to the gateway 52. For purposes of the present method, we can assume that content requests from the devices pass through the gateway 52 on their way to the content delivery system 14.

With the arrangement shown in FIG. 3, gateway 52 can apply functions of the present method with respect to content requests transmitted by the cellular wireless devices 54, 56. Further, however, the gateway (and/or some other element possibly working in conjunction with the gateway or otherwise for the access provider) could apply similar functions with respect to content requests from other client stations. To illustrate, FIG. 3 depicts a personal computer 44 connected by a landline link with packet-switched network 58. Such a computer, if operated by one of the access provider's subscribers, may similarly be arranged to communicate through gateway 52. (Gateway 52, for instance, may provide a web portal function, with which the computer may communicate, to obtain content available through the portal.) Thus, gateway 52 and/or another element may apply functions of the present method just as well with respect to content requests from computer 44 or, for that matter, other types of client stations as well.

Content delivery system 14 may also take various forms, the particular details of which are not critical. Preferably, for instance, content delivery system 14 will function to generate and send content lists, and updates of those lists, to client stations, and content delivery system 14 will function to deliver content items to requesting client stations. Thus, as shown, content delivery system 14 may comprise a content-list transmission function 64 and a content-server function 66. These functions could be integrated together on a single computer coupled with packet-switched network 58 or could be provided in separate nodes, among numerous other possible functions.

In practice, the content-list transmission function 64 transmits content-lists (including any updates) via access system 12 to client stations. The content-list transmission function could do so by Short Messaging Service (SMS) or Multimedia Messaging Service (MMS) delivery, applying well known SMS or MMS protocols. Alternatively, the content-list transmission function could do so through IP multicast to subscribing client stations. Other example methods are possible as well.

The content server function 66, in turn, preferably maintains various content items and/or channels through which to receive content items for delivery to requesting client stations. Preferably, the content items are those listed in the content-lists that the content-list transmission function 64 sends to the client stations. The content items may include predefined/prerecorded content, such as earlier-established text files, program applications, media recordings, and the like, stored or accessible by content server function 66, so that content server 66 can retrieve those items and transmit them to requesting client stations. Further, the content items may include more dynamic content, such as real-time media feeds (e.g., broadcast television, satellite transmissions, Internet radio, etc.) that the content server 66 can receive and transmit in substantially real-time to requesting client stations.

Figure 4:
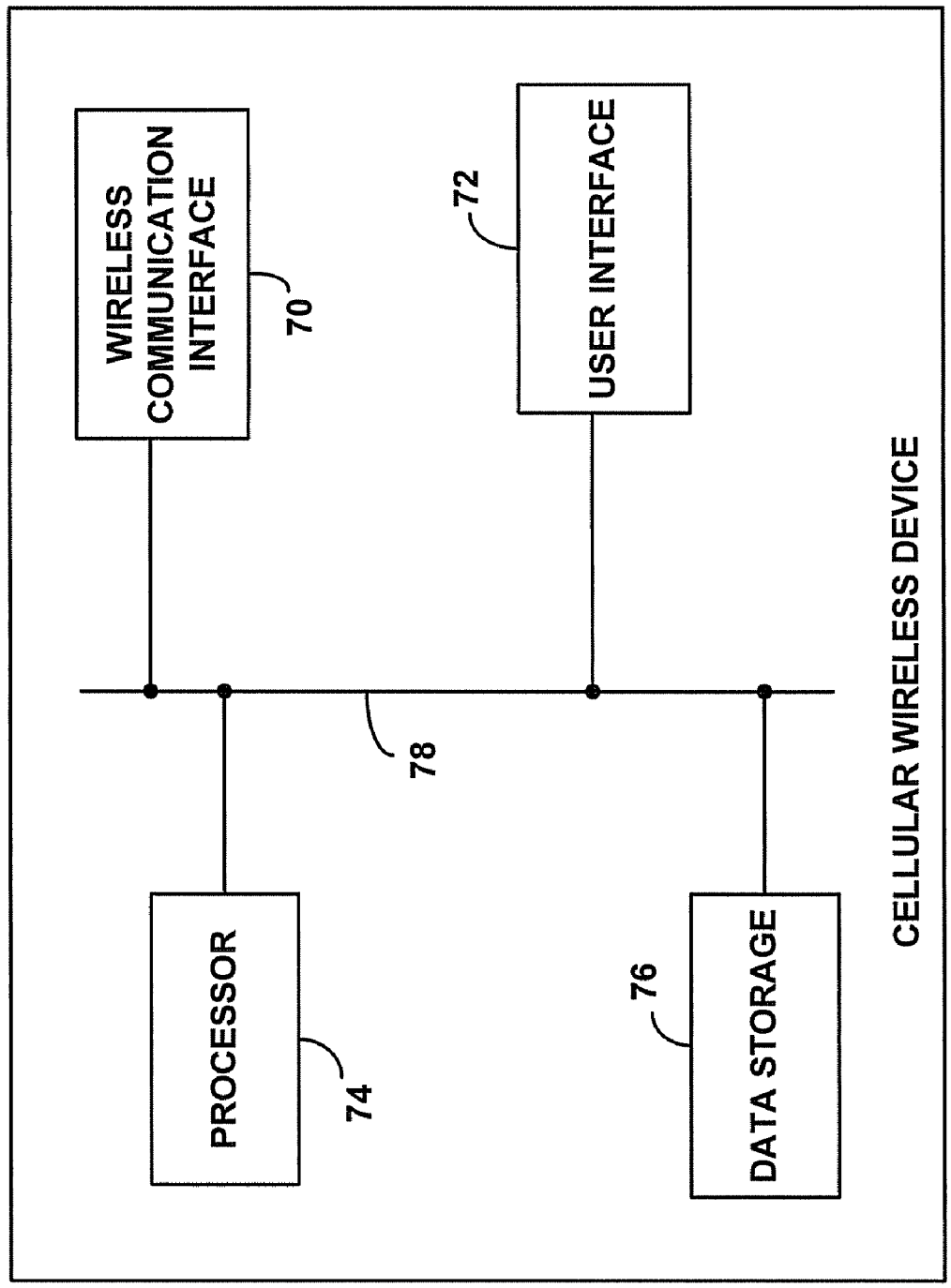
FIG. 4 is a simplified block diagram of a client station operable within the exemplary method.

Referring now to FIG. 4, a simplified block diagram of a cellular wireless device operable within the exemplary method is provided. As shown, the exemplary device includes a wireless communication interface 70, a user interface 72, a processor 74, and data storage 76, all of which may be coupled together by a system bus or other connection mechanism 78.

Wireless communication interface 70 may comprise a cellular wireless chipset of the type arranged to engage in air interface communication with RAN 50 through an agreed protocol, such as one of those noted above for instance. Further, the wireless communication interface 70 preferably includes one or more antennas (not shown) to facilitate air interface communication.

User interface 72 provides a mechanism through which a user can interact with the device. The user interface 72 preferably includes input components such as a keypad, a microphone, a camera, and/or a touch-sensitive screen, and output components such as a display screen and loudspeaker. The user interface also preferably includes analog-digital conversion circuitry and underlying control logic for interfacing with a user, such as to convert digital content to a presentable analog form and to receive analog content and convert it to digital form for transmission or other processing.

For purposes of the present method, user-interface 72 may function to display to a user a list of available content items, and to receive a user selection of a desired content item, in response to which the device will then generate and send a content request seeking the selected content item. The presentation of the content-list may occur within a menu system on the device, through a more specific application, or in any other manner, the details of which are not important.

Processor 74 may comprise one or more general purpose processors (e.g., INTEL processors) and/or one or more specialized processors (e.g., digital signal processors and/or application specific integrated circuits). Data storage 74, in turn, may comprise one or more volatile and/or non-volatile storage components, such as magnetic, optical, or organic storage, and may be integrated in whole or in part with processor 72.

In the exemplary embodiment, data storage 74 stores various data and program instructions executable by processor 72 to facilitate implementation of the method. The program instructions may function to receive a content list, and updates thereto, that designate various available content items and that include with respect to at least each payable content item (possibly not the non-payable content items) a flag and/or other value indicating whether the content item is payable. Further, the program instructions may function to present the content list to a user of the device and to allow a user to select a desired content item. And the program instructions may function to then generate and send a content request seeking the selected content item, and including in the content request an indication of the flag value or other payment data that was included with the content item designation.

Figure 5:
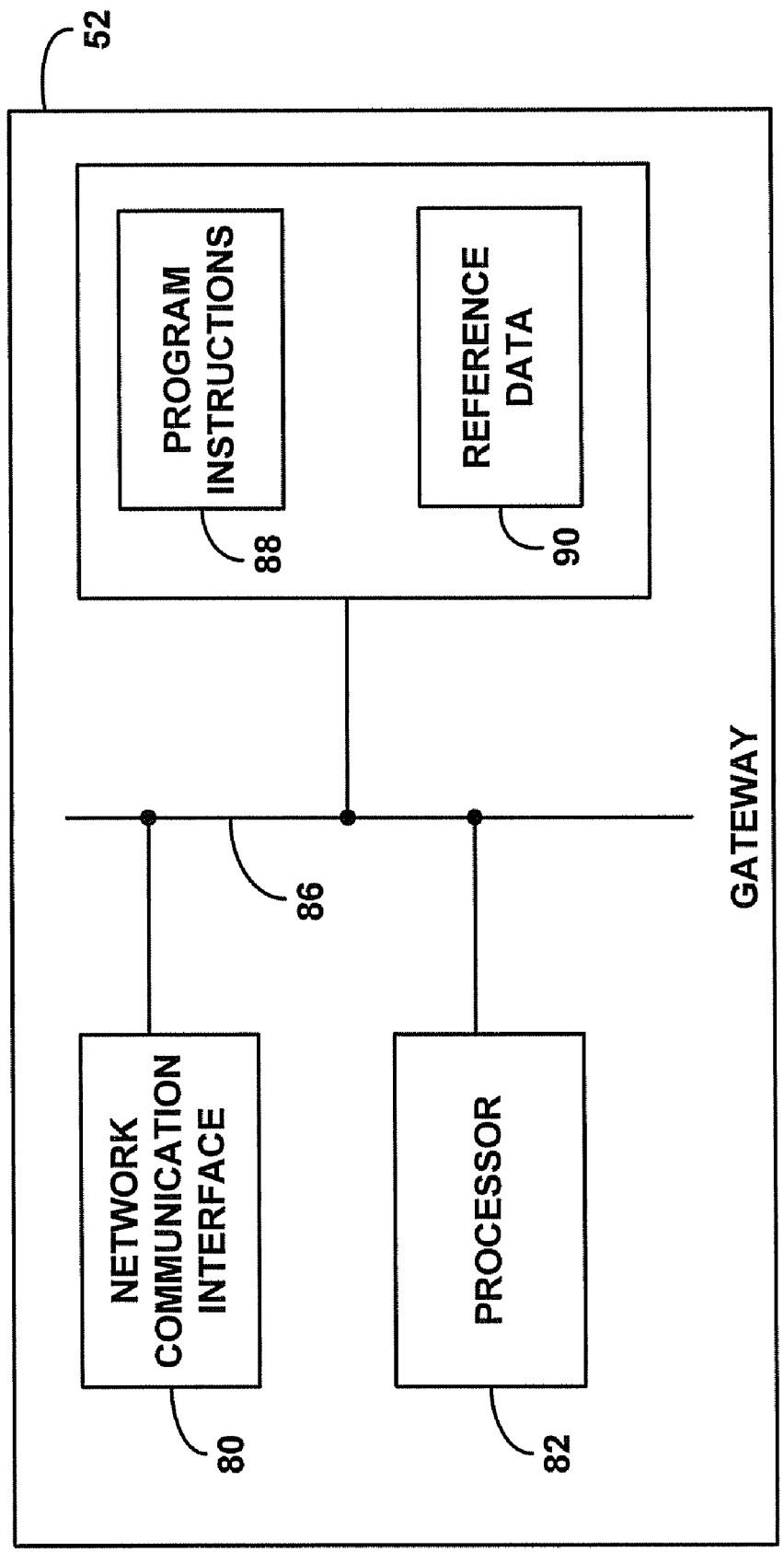
FIG. 5 is a simplified block diagram of a gateway operable within the exemplary method.

Referring next to FIG. 5, a simplified block diagram of gateway 52 is provided, to illustrate some functional components that such an element could include. More generally, the block diagram of FIG. 5 could be considered to represent any entity within the communication path between the client stations and the content delivery system 14, as that entity would be capable of carrying out certain functions of the present method such as reading payable flags from content requests and maintaining a count or other record of payable content transactions.

As shown in FIG. 5, gateway 52 includes a network communication interface 80, a processor 82, and data storage 84, all of which may be coupled together by a system bus, network, or other connection mechanism 86.

Network communication interface 80 may comprise a mechanism though which gateway 52 can communicate on packet-switched network 58. For instance, network communication interface 80 may comprise an wired or wireless Ethernet connection module, possibly in connection with one or more other routers or other elements, and applicable program logic, to facilitate connectivity.

Processor 82 may comprise one or more general purpose processors (e.g., INTEL microprocessors) and/or one or more special purpose processors (e.g., digital signal processors, application specific integrated circuits, etc.) Data storage 84, in turn, may comprise one or more volatile and/or non-volatile storage components, such as magnetic, optical, or organic storage, and may be integrated in whole or in part with processor 82. Data storage 84 may take the place of database 40 or may include database 40. Database 40 may further be accessible by processor 82 via network 58 or in some other manner.

As shown, data storage 84 includes program logic 88 and reference data 90. Program logic 88 is preferably executable by processor 82 to carry out various functions described herein, such as receiving content requests, reading flag values from the content requests to determine whether the requested content is payable or not, and thereby maintaining records of payable content transactions, to facilitate proper accounting between the access provider and the content provider. Reference data 88 may then hold data such as a count of payable content transactions and/or payment amounts determined based on data included within content requests passing from client stations to the content delivery system 14 through the gateway 52. These functions and data will be understood with reference to the remaining figures and the following description.

FIG. 6 is a flow chart depicting functions that can be carried out in accordance with an exemplary embodiment of the present method. In particular, the flow chart depicts an auditing method for tracking content transactions between a content provider and client stations via an access system operated by an access provider, to facilitate determining an amount of payment to exchange between the access provider and the content provider for content items delivered to the client stations.

As shown in FIG. 6, at step 100, the method first involves transmitting to the client stations descriptions of available content items, where the description of each content item provides data specifying whether the content item is payable or non-payable. This transmission preferably occurs from the content provider, such as from the content-list transmission function 64. However, it could just as well originate from some other point. Preferably, however, the list is representative of available content items. Further, it should be understood that the content list could represent content items available from multiple content providers, and the present invention could be carried out cooperatively for the multiple content providers or separately for each.

In practice, the content item descriptions can be sent to the client stations in the form of an XML file or the like, which designates each available content item and specifies for each content item various information such as (i) a name of the content item, usable by the client station to designate the content item in an understandable manner for a user, (ii) a URI or other identification of the content item, indicating a network location of the content item, and, (iii) possibly in conjunction with the URI (e.g., as part of the URI, or as a query parameter), or separately from the URI, data indicating whether the content item is payable or non-payable.

The data indicating whether the content item is payable or non-payable may comprise a Boolean flag that can be set in a payable state (e.g., "1") or a non-payable state (e.g., "0") and can thereby indicate whether the content item is payable or non-payable. Further or alternatively, the data could comprise an actual payment value indicating an amount of payment that should be exchanged between the access provider and the content provider for delivery of the content item. The payment value could be a monetary value or some other sort of payment value. Further, in a preferred embodiment, the payment value would be provided in a coded form, such that, if a user of the client station gains access to the underlying XML data, the user would be unlikely to understand what the payment value represents, but such that the access system 12 could interpret the coded form to represent a particular payment value. For instance, various payment values could be represented by respective bit strings or the like, and the access system 12 could maintain data that correlates the bit strings with the payment values.

Without limitation, the following are simplified examples of how an exemplary XML content list may appear in practice:

Example 1

<xml>
   <channel name="NBC" href="rtsp://nbc.com/nbc.3gp" payable="yes"/>
   <channel name="CNN" href="rtsp://cnn.com/cnn.3gp" payable="no"/>
</xml>

Example 2

<xml>
   <channel name="NBC" href="rtsp://nbc.com/nbc.3gp" payment="01011101"/>
   <channel name="CNN" href="rtsp://cnn.com/cnn.3gp" payment="11111111"/>
</xml>

Example 3

<xml>
   <channel name="NBC" href="rtsp://nbc.com/payable/nbc.3gp"/>
   <channel name="CNN" href="rtsp://cnn.com/cnn.3gp"/>
</xml>

In the first example, each content item designation includes a "payable" flag with a "yes" or "no" value. A "yes" value indicates that the content item is payable, whereas a "no" value indicates that the content item is not payable. This arrangement is particularly simple, as the requesting client station can simply read the flag value and include that flag value in a content request.

In the second example, each content item designation includes a coded payment value. The payment value may function as a payment flag, in that a non-zero payment value may constitute an indication that the content item is payable, whereas a zero payment value may constitute an indication that the content item is non-payable. Alternatively, a separate Boolean flag may be included as well. The payment values shown are coded values that could be interpreted by the access system 12 to represent an applicable payment amount. For instance, the value "11111111" may signify a value of zero (which a user would likely not understand from reading the value).

In the third example, each content item designation includes a payable flag within its URI. The "NBC" content item designation, for instance, includes the term "payable" within the URI. Thus, the access system 12 could parse the URI and detect the payable flag. On the other hand, the "CNN" content item designation does not include the "payable" designation, and the absence of a payable designation could be interpreted to constitute a flag indicating that the content item is non-payable. Other content list formats, providing additional or different data, are possible as well.

The act of sending the content item descriptions to the client stations can involve sending the descriptions through any messaging protocol now known or later developed, examples of which include without limitation SMS and MMS messaging, and IP multicast. Further, the act may include subsequently sending one or more updates to the content item descriptions, such as additions, deletions, or modifications of the XML document. Upon receipt of such updates, a client station would programmatically update the content item descriptions for presentation to the user.

Continuing with reference to FIG. 6, at step 102, the method next involves receiving at the access system 12, from the client stations, content requests seeking particular ones of the content items, where each content request (i) is generated by a client station, (ii) seeks a given content item, and (iii) includes the data provided by the description of the given content item. This function preferably occurs at gateway 52 or another such entity within access system 12.

The content requests received from the client stations may take any form, the details of which are not critical and may depend on various factors, such as the type of communication protocol used, an the form of the content listing provided to the client stations. By way of example, if a content item is designated with an RTSP URI, the content request generated by the client station when a user selects the content item may comprise an RTSP SETUP message to content delivery system 14 or an RTSP PLAY message to the content delivery system.

In accordance with the RTSP standard noted above, an RTSP SETUP message would contain the RTSP URI followed by various headers, and serves to cause the content delivery system to allocate resources and establish an RTP session through which the requested media can be streamed to the requesting client station. For the present method, a new "x-payment" header or the like can be included in the RTSP SETUP message and may specify the payment data that was provided in the content item description. Thus, when the client station generates the RTSP SETUP message, the client station may programmatically include that added header, automatically writing as the header value the payment data (e.g., payment flag) that was included in the content item description. Alternatively, if the payment data was included as part of the RTSP URI, it would be included automatically when that URI is included in the content request.

Similar mechanics could be used to include the payment data within other sorts of content requests. For instance, if the content request is sent as a SIP or HTTP message, the same basic concepts can apply. Still other, more variant, content request types may include the payment data in still other forms.

At step 104 in FIG. 6, the method next involves proxying the content requests from the access system to the content provider, in order to enable the content provider to responsively deliver the requested content items to the requesting client stations. Where the content requests are received by gateway 52, for instance, gateway 52 would forward the content requests via packet-switched network 58 to content delivery system 14. The routing of the content requests to the content delivery system 14 may be accomplished conventionally in accordance with a URI (if any) indicated in each request or in some other manner.

At step 106, the method next involves, at the access system 12, reading the data from the content requests to determine whether the requested content items are payable or non-payable, and making records for content requests that are thereby determined to request payable content items. Those records are then cooperatively usable to determine the amount of payment that should be exchanged between the access provider and the content provider for content items delivered to the client stations.

The acts of the access system 12 reading the data from the content requests and making the records is also preferably carried out by gateway 52. The gateway may read the payment data from the content request in a manner depending on how the payment data is included in the content request. For instance, if the payment data is included in a special header in an RTSP SETUP message, the gateway may read the payment data from that header. On the other hand, if the payment data is included in the RTSP URI, the gateway may parse the URI to extract the payment data.

The act of making records of payable content transactions may also take various forms. For example, if the data in the content request comprises a Boolean flag indicating whether the content item is payable, the act of making the records may involve, for each content request, making a determination of whether the flag is in the payable state and thus indicates that the content item is payable, and, only if the determination is that the flag indicates the content item is payable, incrementing a count of how many instances of payable content transactions have occurred. In this regard, the count may begin at zero, so the first incrementing of the count may increase it to one. Each subsequent increment may then further increase the count by another one.

As another example, if the payment data includes a specific indication of a payment value for the content item (even if coded, and then translated into a payment value by the access system 12), the act of making records of payable content transactions may involve reading the payment value from the content request and adding the payment value to an ongoing tally constituting a total payment amount. As with the payable item count, the tally may begin at zero.

The exemplary method may then further include at step 108 using the records of payable content transactions as a basis to determine a payment amount that should be exchanged between the access provider and the content provider. For instance, the access system 12 may multiple the count of payable content transactions by a per-item payment value to establish a total payment amount. Alternatively, if the access system 12 has been maintaining a tally of payment value, it may consider that tally to be the total payment value.

The gateway may also make records of payable content transactions separately for different types of content items, such as for audio or video content, or for television, radio, news, sports, concerts, live, pre-recorded, or other types of content. For instance, each content item designation, and in turn content request, could include a type indicator that the gateway could read as a basis to determine the content type. If the gateway determines from reference to the payment data (e.g., Boolean flag) that the content item is payable, the gateway may then increment a count respectively for that content type. Ultimately, for each content type, the gateway may then multiply the count by a payment value per item of that content type, to establish a total payment amount for delivery of content items of that type. In turn, the access system 12 may sum all of the type-based totals to compute an overall total payment value to be exchanged between the access provider and the content provider.

An exemplary embodiment of the present method has been described above. Those of ordinary skill in the art will appreciate, however, that changes from the embodiment described are possible while remaining within the spirit of the appended claims and their equivalents.

We claim:

1. An auditing method for tracking content transactions between a content provider and client stations via an access system operated by an access provider, to facilitate determining an amount of payment to exchange between the access provider and the content provider for content items delivered to the client stations, wherein each content item is either payable or non-payable, the method comprising:
   transmitting to the client stations descriptions of available content items, wherein the description of each content item provides data specifying whether the content item is payable or non-payable;
   receiving at the access system, from the client stations, content requests seeking particular ones of the content items, wherein each content request (i) is generated by a client station, (ii) seeks a given content item, and (iii) includes the data provided by the description of the given content item;
   proxying the content requests from the access system to the content provider to enable the content provider to responsively deliver the requested content items to the requesting client stations; and
   at the access system, reading the data from the content requests to determine whether the requested content items are payable or non-payable, and making records for content requests that are thereby determined to request payable content items, wherein the records are cooperatively usable thereafter to determine the amount of payment to exchange between the access provider and the content provider for content items delivered to the client stations.

2. The method of claim 1, wherein the data comprises a Boolean flag having a payable state and a non-payable state and thereby indicating whether the content item is payable or non-payable, and wherein making the records comprises:
   for each content request, making a determination of whether the flag is in the payable state and thus indicates that the content item is payable, and, only if the determination is that the flag indicates the content item is payable, incrementing a count of how many instances of payable content transactions have occurred,
   wherein the count is usable to determine an amount of payment to exchange between the access provider and the content provider for content items delivered to the client stations.

3. The method of claim 2, further comprising:
   using the count to determine the amount of payment to exchange between the access provider and the content provider for content items delivered to the client stations.

4. The method of claim 3, wherein using the count to determine the amount of payment comprises multiplying the count by a per-item cost to determine the amount.

5. The method of claim 2, wherein each content request includes an indication of a type of the requested content item, the method further comprising, for each content request whose flag indicates that the requested content item is payable:
   at the access system, identifying the type of the requested content item by reading the type indication from the content request, and incrementing a count of how many instances of payable content transactions have occurred with respect to content items of the identified type.

6. The method of claim 5, wherein the access system thereby maintains a count respectively for each type of content item of how many payable content transactions have occurred with respect to the type of content item, the method further comprising:
   multiplying each count by a cost for the respective type of content item, to establish a total payment amount per type of content item; and
   summing the total payment amounts for multiple types of content items, to determine a total amount of payment that should be exchanged between the access provider and the content provider for content items delivered to the client stations.

7. The method of claim 6, wherein the types comprise at least one type selected from the group consisting of video content and audio content.

8. The method of claim 1, wherein the data in each given content request for a payable content item further specifies a payment value that should be exchanged between the access provider and the content provider for the requested content item, and wherein making the records comprises:
   for each content request for a payable content item, the access system reading the specified payment value and incrementing by the specified payment value a sum total of payment that should be exchanged between the access provider and the content provider for payable content transactions.

9. The method of claim 8, wherein the sum total of payment is for a plurality of different content items.

10. The method of claim 8, wherein each content request includes an indication of type of the requested content item, the method further comprising:
    maintaining a plurality of sum totals of payment, one respectively for each type of payable content item.

11. The method of claim 8, wherein the data specifies the payment value specifies as a code that does not reveal the payment value to a user of the requesting client station but that is interpretable by the access system to specify the payment value, the method further comprising the access system interpreting the code to determine the payment value.

12. The method of claim 1, wherein the content items include full content items and samples of content items, wherein the full content items are payable and the samples of content items are non-payable.

13. The method of claim 1, wherein the content items comprise mobile television content.

14. The method of claim 1, wherein the content items comprise streaming media that is streamed by the content provider to the client stations, wherein the streaming media is played out as the streaming media is received and buffered by the client stations.

15. The method of claim 1, wherein transmitting to the client stations the descriptions of available content items comprises transmitting to each client station a description document structured in extensible-markup-language (XML), wherein the description document lists each content item description,
    whereby the XML document is usable by a recipient client station to present a list of the available content items to a user of the recipient client station.

16. The method of claim 15, wherein transmitting to the client stations the descriptions of available content items further comprises subsequently transmitting to the client stations at least one update to the description document, wherein the at least one update comprises an update selected from the group consisting of (i) an addition of a content item description, (ii) a deletion of a content item description, and (iii) a modification of a content item description.

17. The method of claim 1, wherein each content request is generated by a given client station in response to a user of the given client station selecting a content item from among multiple content items and requesting the client station to obtain the selected content item.

18. The method of claim 1, wherein the access provider is a wireless service provider, and wherein the client stations comprise client stations subscribing to service provided by the wireless service provider, wherein the wireless service provider provides the client stations with wireless packet data service through which the client stations obtain the requested content items from the content provider.

* * * * *